T. McINTYRE.
Loom-Shuttles..

No. 141,803.  Patented August 12, 1873.

Witnesses.
J. W. Piper.
L. N. Möller.

Thomas McIntyre.
by his attorney
R. H. Eddy.

UNITED STATES PATENT OFFICE.

THOMAS K. McINTYRE, OF SALEM, MASSACHUSETTS, ASSIGNOR TO HIRAM A. PEASLEE AND JABEZ R. ARNOLD, OF SAME PLACE.

IMPROVEMENT IN LOOM-SHUTTLES.

Specification forming part of Letters Patent No. 141,803, dated August 12, 1873; application filed May 16, 1873.

*To all whom it may concern:*

Be it known that I, THOMAS K. McINTYRE, of Salem, in the county of Essex and State of Massachusetts, have invented a new and useful Improvement in Shuttles for Looms; and do hereby declare the same to be fully described in the following specification and represented in the accompanying drawings, of which—

Figure 1:
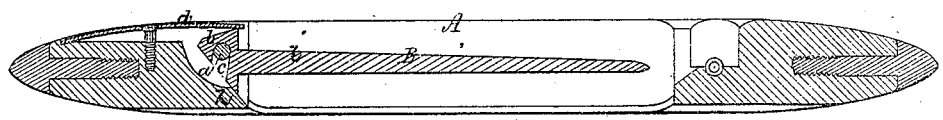
Figure 2:
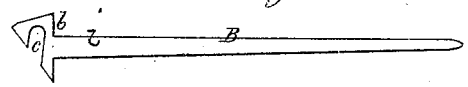
Figure 3:
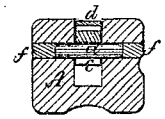

Figure 1 denotes a longitudinal section of a shuttle with my invention. Fig. 2 is a side view of the spindle of such shuttle. Fig. 3 is a transverse section of the shuttle taken through the pivot of the spindle.

Shuttle-spindles, as heretofore constructed, have had a cylindrical hole through the head of each, such hole being to receive the pivot or pin going through the shuttle-body transversely, and employed to hold the spindle to the said body, so that the spindle could be turned into and out thereof. In case of breakage of the spindle, the pin has to be driven out of the hole before substitution of another spindle. This generally weakens the hold of the pin in the wood, and renders, while the shuttle may be in use, the pin liable to work endwise in the hole, so as to project from it more or less. Such a projection of the pin is generally sure to produce damage to the reed of the lay of the loom during throw of the shuttle. It is very common for the shuttle-pins to work loose and project from that side of the shuttle which comes next the reed, in consequence of which the reed soon becomes grooved lengthwise of it, and burrs are produced on the dents, which cut or injure the warp.

My improvement renders it unnecessary to remove from the shuttle-body the spindle pivot or pin after once having been inserted therein, as, with my improvement, the spindle may be either put in place on the pin or removed from it while the pin is within the shuttle-body. Furthermore, my invention enables the bearing of the pin and spindle-head to be oiled with great facility, and thereby overcomes a difficulty incident to the ordinary spindle provided with a cylindrical hole to receive the pin.

In the drawings, A denotes the body of the shuttle, $a$ the pivot or pin, and B the spindle, supported on such pivot. In carrying out my invention I construct the head $b$ of the spindle with a bearing-notch, $c$, semicircular at its inner end and extended laterally downward in the head, and so as to open out of the bottom or lower edge thereof, as shown, the said notch having a width, at least, corresponding with or equal to the diameter of the pivot or pin, in order that when the cap-spring $d$ is off the shuttle the spindle may readily be placed upon or removed from the pin, the spring, when in place, serving to maintain the spindle in connection with or on the pin.

When the spindle is raised to its highest position oil may be readily dropped or passed underneath the spindle-head and into the notch and upon the pin, so as to lubricate the bearing-surfaces of the pin and the spindle.

The down-stop $h$ of the head of the spindle is below the slot in the head, the spring being arranged above the head, all as shown. With the head formed as represented, and the spring arranged above and on the head, as shown, such spring not only serves to keep the spindle-head upon the pin, in both extreme positions of the spindle as well as in intermediate ones, but answers as an up-stop to the spindle-shank $i$, which, on being drawn upward, brings up against the spring. Furthermore, in consequence of the mouth of the notch $c$ being below the pin $a$, and the spring $d$ being arranged over the spindle-head, the notch becomes protected from falling fibers or dust; and when the spindle is down, with its head against the stop $h$, the spring and the said stop effectually protect the pin and notch from dust and filaments.

In applying the pin to the shuttle-body I usually construct the former of a length less than the width of the body at the place of introduction of the pin, and I bore the pin-hole partially through the body a distance equal to or a little greater than the length of the pin; if greater than the length of the pin, I, after insertion of the pin as far as the hole will permit, insert and glue a plug in the open part of the hole and over the outer end of the pin.

Figure 4:
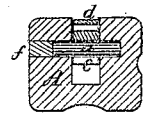

Fig. 4 is a transverse section of the shuttle, showing the pin-hole plugged at one end and going partially through the shuttle-body, the plug being shown at $f$; or, when the pin-hole goes entirely through the shuttle-body, I make the pin of a length less than that of the hole and plug the hole at both ends and against the pin, as shown at $ff$ in Fig. 3.

This mode of applying and guarding the pin effectually prevents it working out or protruding from the shuttle, so as to endamage the reed during a throw of the shuttle.

I claim—

1. In the loom-shuttle the spindle-shank $i$, and notched head $b$, the pin or pivot $a$, and the spring $d$, constructed and arranged substantially as represented, whereby the spring not only performs the functions of protecting the head and notch from filaments and dust, and of retaining the head upon the pin, or preventing it from getting off such in any of the positions of the spindle, but serves as an up-stop to the shank $i$ of the spindle B.

2. With the spindle-head provided with the bearing-notch, as described, the pivot-pin hole, carried either wholly or partially through the body of the shuttle, in combination with the pivot-pin fixed in such hole by one or two plugs, all being substantially as specified.

THOMAS K. McINTYRE.

Witnesses:
R. H. EDDY,
J. R. SNOW.